Feb. 9, 1954          J. W. KAPPEN          2,668,681

ARTICLE HANDLING MEANS

Filed Feb. 21, 1948

Inventor

John W. Kappen

Tom Walker
Attorney

Patented Feb. 9, 1954

2,668,681

UNITED STATES PATENT OFFICE 2,668,681

ARTICLE HANDLING MEANS

John W. Kappen, Dayton, Ohio

Application February 21, 1948, Serial No. 10,100

1 Claim. (Cl. 248—120)

This invention relates to article handling means, and more particularly to devices useful in the transportation, distribution and storage of packaged goods or the like.

This application is a continuation in part of my application Serial No. 609,448, filed August 7, 1945, now issued September 12, 1950, as Patent No. 2,521,727.

Although by no means limited thereto, the pallet embodying the present invention is particularly applicable to the transportation and distribution systems of chain grocery stores, truck lines and the like, wherein a large number of packaged goods are assembled in a warehouse or terminal, transported by truck or other means to distributors, retail stores or the like and there unloaded, temporarily stored and finally placed on display for sale.

The object of the invention is to simplify the construction as well as the means and mode of operation of article handling means of the pallet or tray type, whereby such pallets may not only be economically manufactured, but will be more efficient and satisfactory in use, adaptable to a wide variety of uses, having relatively few parts and be unlikely to get out of repair.

A further object of the invention is to facilitate the transportation and distribution of goods by providing a device combining the functions of a transportable tray and of a pallet usable during manufacture, storage and delivery of the goods.

Another object of the invention is to obtain a light weight pallet of simple, inexpensive yet sturdy construction, adaptable for use as a merchandise carrier in the loading of transport vehicles.

A further object is to restrain shifting of goods in transit by constructing and arranging the pallets for a predetermined flexure under load.

Still another object is to enable caster wheels, legs, or combinations of legs and wheels to be readily installed upon and detached from the pallet whereby to convert it from a pallet of the skid type to a freely movable, semi-live, or live merchandise support, and vice versa.

A further object of the invention is to provide a pallet of the character described, possessing the advantageous structural features, the inherent meritorious characteristics and the mode of operation herein described.

With the above primary and other incidental objects in view as will more fully appear in the specification, the invention intended to be protected by Letters Patent consists of the features of construction, the parts and combinations thereof, and the mode of operation, as hereinafter described or illustrated in the accompanying drawings, or their equivalents.

Referring to the accompanying drawing, wherein is shown the preferred but obviously not necessarily the only form of embodiment of the invention, Fig. 1 is a view in perspective of a pallet constructed in accordance with the present invention;

Like parts are indicated by similar characters of reference throughout the several views.

Figure 1:
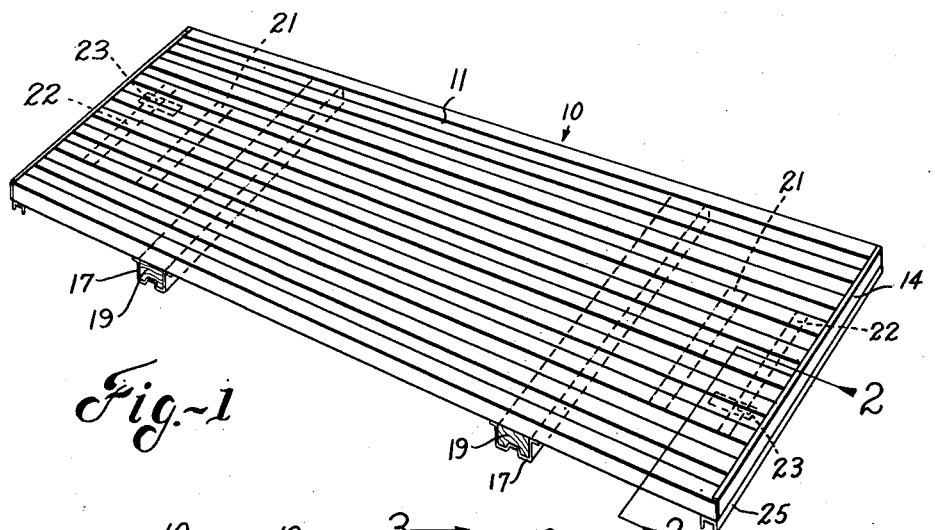
Figure 2:
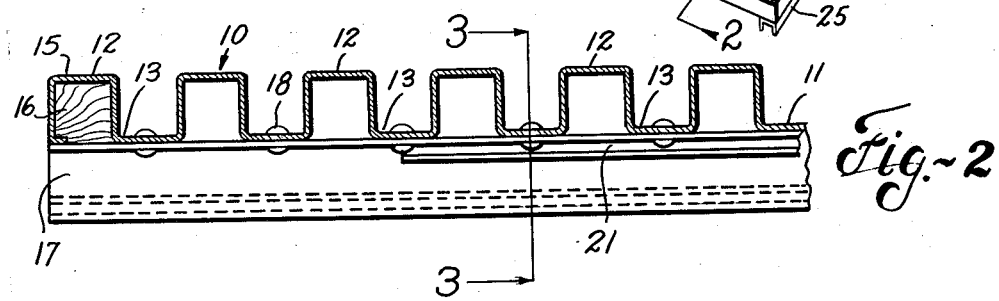
Fig. 2 is a fragmentary view in cross-section, taken substantially along the line 2—2 of Fig. 1.

Referring to the drawings, the combination tray and pallet, indicated generally at 10 in Fig. 1, comprises a one-piece metal sheet 11 rectangular in form and made, according to one practical embodiment of the invention, of an aluminum alloy. The sheet 11 is pressed or otherwise formed to a corrugated shape, thereby forming alternate high and low lands 12 and 13. The longitudinal indentations may be termed recesses or channels having substantially parallel sides. The recesses extend throughout the length of the metal sheet 11, and the ends thereof are finished off and protected by strips 14 welded or otherwise secured to the sheet.

The side edges of the sheet 11 extend downward from a high land 12 and are bent inward, in parallel relation to and in a common plane with the low lands 13, to define a semi-enclosed corrugation 15 within which a wood filler 16 is inserted. The fillers 16 not only lend strength to the device without imparting rigidity, but protect the edges of pallet from deformation and damage in the handling thereof by fork lift trucks, for example.

Figure 3:
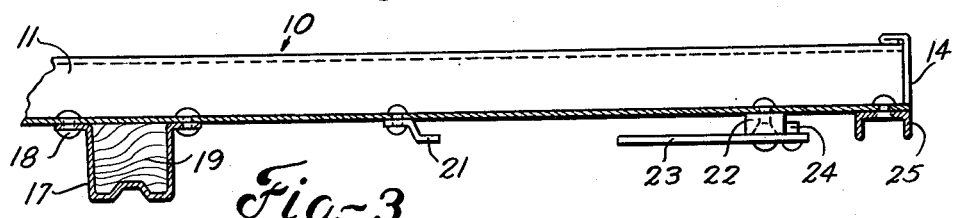
Fig. 3 is a fragmentary view in longitudinal section, taken substantially along the line 3—3 of Fig. 2.

On one side of the metal sheet 11, which in use is the underside thereof, are two hollow members 17 which serve as skids and reinforcement means, and also permit the handling of the pallet by fork lift trucks. The members 17 occupy longitudinally spaced transverse positions short of the respective ends of the sheet 11. As particularly shown in Fig. 3, the members 17 are generally U-shaped in cross-section with their free ends turned over for abutment with the underside of the low lands 13 of sheet 11. At spaced transverse points, as at each land 13, rivets 18 are passed through and connect the turned over ends of the member 17 and sheet 11. Members 17 contain wood fillers 19 which serve the same purpose as the above-mentioned fillers 16.

For modification of the device from a pallet of the skid type to a freely movable support means, detachable casters or legs may also be mounted on the underside of sheet 11. This is accomplished by a pair of transverse runners 21 riveted to the sheet 11, one at each end of the area bounded by the skid members 17. Arranged in cooperative, longitudinally spaced relation to each runner 21 is a transverse bar 22 also riveted to sheet 11. Bar 22 parallels runner 21, the two elements serving as guides or supports for a plate common to a pair of casters or legs. On each bar 22 is pivotally mounted a latch 23 which is swingable by hand into and out of a position of retention with respect to a caster plate, opposite extremes of movement of the latch being defined by a stud 24.

Completing the assembly of parts making up the combination tray and pallet is a pair of rails 25, one of which is riveted to each extreme outer end of the sheet 11, on the underside thereof.

Figure 4:
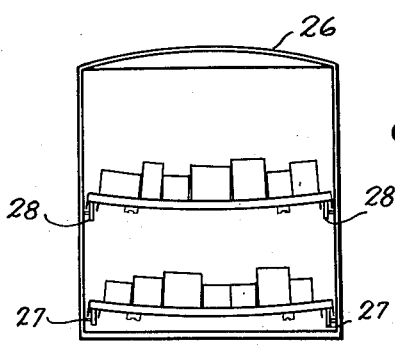
Fig. 4 is a partly schematic view of a truck loaded through use of the pallets embodying the present invention.

In the use referred to in the introductory portion of this description a plurality of pallets 10 may be arranged in parallel relation and in tiers, as shown in Fig. 4. As there illustrated, a truck, truck trailer or other type of transport body 26, is fitted in its interior with spaced sets of rollers 27 and 28, extending longitudinally along the side wall of the body. Each set of rollers 27 and 28 is engaged by the rails 25 and serve as a support for a series of pallets 10 on which supports the pallets are freely movable.

As shown in Fig. 4, one of the advantageous features of the present pallet is its operation when supported upon the rollers 27—28 of a transport body. Being supported at its extreme ends, and being of a semi-flexible construction, the pallet 10 when loaded and placed in the body 26 tends to deflect and become bowed. Such deflection causes the load thereon to shift toward the center of the pallet. The greater the vibration of the transport body, the more compact the load becomes, thereby eliminating the necessity for otherwise anchoring the load upon the pallets. The present construction embodying the longitudinally extending marginal fillers 16 results in a compound deflection, i. e., both longitudinally and transversely of the pallet. This produces in effect a substantially spherical depression or cavity, toward the center of which the load shifts from all directions.

This particular construction is of great advantage when the load consists of a plurality of relatively small packages, such as canned goods or the like, and the transport body is only partially filled. If the body is to be completely filled, the longitudinal flexing of the pallet, although still desirable, is not absolutely necessary, since the load does not have as great a tendency to move transversely thereof. This is particularly true in railroad freight cars or dock to dock truck delivery.

The present form of article handling and conveying equipment is particularly well adapted, not only for truck transport, but for all other forms of transportation such as railroad and air transport.

Mounted in the truck or other transport body 26, the pallets 10 serve as trays for support of the goods. In making deliveries, a tray and its load may be lifted from the body as a unit and be so retained until distribution of the goods. Outside the body the caster wheel assemblies may be installed as previously described, this being a quick and easy operation performed just before or just after removing the device from the conveyance. The pallet may then be freely moved from place to place as desired.

The manner of use of the above described pallets and their function while in transit appears to be from a practical standpoint of great benefit to the transportation industry, a complete reorganization of transportation and distribution systems in the wholesale grocery field already having been caused by the fully satisfactory tests of the present equipment. While originally developed for use in conjunction with the transport vehicle shown and claimed in my copending application, Serial No. 609,448, filed August 7, 1945, now matured into Letters Patent No. 2,521,727, issued September 12, 1950, the instant pallet embodying the present features of advantage is by no means limited to use with the particular vehicle shown in my copending application, and has, in fact, caused considerable comment and interest among other fields of transportation, for example, aircraft and railroad. The instant pallet has also been found quite satisfactory and useful in the shipment of bulky merchandise such as refrigerators and stoves. When used for such purposes, the pallet may serve as the carrier or support for the merchandise while passing through the assembly line in the process of manufacture. When the merchandise is fully assembled, the completed article is already in position upon the pallet which will be used in the transportation of the article to the retailer or ultimate consumer. Thus, transfer of the completed article from the assembly line pallet to a shipping pallet is completely eliminated.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claim.

Having thus described my invention, I claim:

In a pallet of sheet material, the combination of a rectangular platform of solid material having longitudinally extending corrugations therein, the side walls of the corrugations being substantially parallel; a filler strip at each end of the platform for covering the corrugations in the platform, a trackway at each end of the platform comprising a channel iron the base of which is attached to the bottom of the depressions in the platform, the corrugations at the side of the platform having reinforcing members inserted therein and extending the length of said corrugations, and combined supports and skid members longitudinally spaced transversely short of the respective ends of the platform, said support and skid members being U-shaped and each having a reinforcing member enclosed therein, said support and skid members extending lower than the trackway at each end of the platform.

JOHN W. KAPPEN.

References Cited in the file of this patent

UNITED STATES PATENTS

| Number | Name | Date |
|---|---|---|
| 1,395,483 | Denney | Nov. 1, 1921 |
| 2,347,095 | Garbarino | Apr. 18, 1944 |
| 2,446,914 | Fallert et al. | Aug. 10, 1948 |
| 2,447,285 | Semonton et al. | Aug. 17, 1948 |
| 2,544,743 | Vrabcak | Mar. 13, 1951 |